United States Patent
Larsson et al.

(10) Patent No.: US 11,098,228 B2
(45) Date of Patent: Aug. 24, 2021

(54) COMPOSITIONS BASED ON SILANE-TERMINATED POLYMERS WITH IMPROVED ADHESION ON THERMOPLASTICS

(71) Applicant: SIKA TECHNOLOGY AG, Baar (CH)

(72) Inventors: Oscar Larsson, Lakewood, NJ (US); Marcel Oertli, Wintherthur (CH)

(73) Assignee: SIKA TECHNOLOGY AG, Baar (CH)

(*) Notice: Subject to any disclaimer, the term of this patent is extended or adjusted under 35 U.S.C. 154(b) by 21 days.

(21) Appl. No.: 16/642,317

(22) PCT Filed: Sep. 17, 2018

(86) PCT No.: PCT/EP2018/075089
§ 371 (c)(1),
(2) Date: Feb. 26, 2020

(87) PCT Pub. No.: WO2019/057670
PCT Pub. Date: Mar. 28, 2019

(65) Prior Publication Data
US 2020/0362212 A1 Nov. 19, 2020

(30) Foreign Application Priority Data
Sep. 20, 2017 (EP) .................. 17192094

(51) Int. Cl.
| | | |
|---|---|---|
| *C09J 183/06* | (2006.01) | |
| *C08K 5/544* | (2006.01) | |
| *C08F 283/12* | (2006.01) | |
| *C08G 18/28* | (2006.01) | |
| *C09J 171/00* | (2006.01) | |
| *C09J 175/08* | (2006.01) | |
| *C08G 77/18* | (2006.01) | |
| *C08G 77/26* | (2006.01) | |
| *C08G 65/336* | (2006.01) | |

(52) U.S. Cl.
CPC ........... *C09J 183/06* (2013.01); *C08F 283/12* (2013.01); *C08G 18/289* (2013.01); *C08K 5/544* (2013.01); *C09J 171/00* (2013.01); *C09J 175/08* (2013.01); *C08G 65/336* (2013.01); *C08G 77/18* (2013.01); *C08G 77/26* (2013.01)

(58) Field of Classification Search
CPC .................... C08L 83/08; C08K 5/544
See application file for complete search history.

(56) References Cited

U.S. PATENT DOCUMENTS

| | | | |
|---|---|---|---|
| 5,364,955 A | 11/1994 | Zwiener et al. | |
| 8,481,668 B2 * | 7/2013 | Gauthier | C08G 18/10 528/34 |
| 2012/0123016 A1 * | 5/2012 | Bolte | C08L 101/10 523/122 |
| 2012/0329942 A1 | 12/2012 | Kohl et al. | |
| 2015/0284609 A1 | 10/2015 | Schlosser et al. | |
| 2016/0083634 A1 * | 3/2016 | Ikeuchi | C08G 77/045 52/415 |

FOREIGN PATENT DOCUMENTS

| | | | |
|---|---|---|---|
| JP | 2017-019908 A | | 1/2017 |
| WO | WO 2005/014741 | * | 2/2005 |
| WO | 2014/079613 A1 | | 5/2014 |
| WO | 2015/108640 A1 | | 7/2015 |

OTHER PUBLICATIONS

Product data sheet for Dynasylan Sivo 203 (no date).*
Oct. 18, 2018 International Search Report issued in International Patent Application No. PCT/EP2018/075089.
Oct. 18, 2018 Written Opinion of the International Searching Authority issued in International Patent Application No. PCT/EP2018/075089.

* cited by examiner

*Primary Examiner* — Marc S Zimmer
(74) *Attorney, Agent, or Firm* — Oliff PLC

(57) ABSTRACT

An adhesive composition, including at least polymer containing silane groups, between 15 and 35 wt.-% of at least one polymeric plasiticzer, between 0.5 and 2.5 wt.-% of at least one monomeric or oligomeric aminofunctional alkoxysilane S1 with a nitrogen content of between 4.5 and 14.5 wt.-%, and between 0.5 and 2.5 wt.-% of at least one oligomeric aminofunctional alkoxysilane S2 with a nitrogen content of between 15 and 20 wt.-%. The adhesive composition is particularly suitable to seal or bond thermoplastic substrates, such as polyolefins or bituminous materials, and shows fast adhesion build-up and low volatile organic carbon (VOC).

14 Claims, No Drawings

US 11,098,228 B2

COMPOSITIONS BASED ON SILANE-TERMINATED POLYMERS WITH IMPROVED ADHESION ON THERMOPLASTICS

TECHNICAL FIELD

The invention relates to compositions based on silane-terminated polymers and their use as adhesives.

STATE OF THE ART

Curable compositions based on polymers containing silane groups play an important role in many industrial applications, for example as adhesives, sealants or coatings. Polymers containing silane groups here are especially polyorganosiloxanes, which are commonly referred to as "silicones" or "silicone rubbers", and organic polymers containing silane groups, which are also referred to as "silane-functional polymers", "silane-modified polymers" (SMP) or "silane-terminated polymers" (STP). They are cured via crosslinking reactions of the silane groups, which are hydrolyzed under the influence of moisture, condense with one another as silanol groups and in so doing form siloxane bonds. Silicones are useful for their high thermal and chemical stability, but they suffer from poor paintabilty and, when used as adhesives, they need adhesion promoters to form stable bonds with many substrates. Silane-terminated polymers on the other hand normally have better adhesion properties and can be used in a very broad range of applications.

Nevertheless, some adhesion substrates are still considered difficult, even for the versatile silane-terminated polymer-based adhesive compositions. Particularly in construction applications there are several materials that are difficult to bond. These mainly include bituminous materials and thermoplastics based on polyolefins. Such materials are commonly used as sealing sheets and façade and window weather membranes to protect the built structure from atmospheric and ground moisture. However, due to their low-energetic surface (for polyolefinic thermoplastics) and migrating low-molecular hydrocarbon species (in the case of bituminous materials), they often lead to adhesive failure or require extensive substrate preparations.

WO 2015/108640 discloses an adhesive composition with strong adhesion on various substrates, the adhesive comprising a methacrylate-functionalized alkoxysilane and an oligomeric amino-functional alkoxysilane. However, the adhesion on low energetic surfaces such as EPDM is still insufficient.

It is thus desireable to obtain an adhesive or sealant based on compositions based on polymers containing silane groups that is able to adhesively bond or seal such difficult substrates, even without the use of pretreatments such as primers or laborious surface modification. It is furthermore desireable that these compositions possess fast adhesion build-up and low volatice organic carbon (VOC) levels in order to be highly efficient adhesives but at the same time beneficial for environment and consumers.

SUMMARY OF THE INVENTION

It is therefore an object of the present invention to provide a one-component adhesive composition based on polymers containing silane groups that shows an excellent adhesion profile on a large variety of non-pretreated surfaces, including polyolefins and bituminous substrates. Furthermore, fast adhesion build-up and low VOC levels of these compositions is a further object of the present invention.

The present invention achieves these objects with the features of independent claim 1.

The combination of between 0.5 and 2.5 wt.-%, based on the total composition, of at least one monomeric or oligomeric aminofunctional alkoxysilane S1 with a nitrogen content of between 4.5 and 14.5 wt.-%, based on the total weight of S1 and between 0.5 and 2.5 wt.-%, based on the total composition, of at least one oligomeric aminofunctional alkoxysilane S2 with a nitrogen content of between 15 and 20 wt.-%, based on the total weight of S2 and between 15 and 35 wt.-%, based on the total composition, of at least one polymeric plasiticzer PL in a one-component adhesive composition based on polymers containing silane groups surprisingly improves the adhesion of said composition on substrates difficult to bond, such as polyolefins and bituminous substrates, in an unexpected manner. Furthermore, these compositions show fast adhesion build-up and low volatile organic carbon (VOC) levels.

Further aspects of the invention are the subject of further independent claims. Particularly preferred embodiments of the invention are the subject of the dependent claims.

Ways of Executing the Invention

The present invention relates in a first aspect to a one-component adhesive composition, comprising
    at least one polymer P containing silane groups;
    between 15 and 35 wt.-%, based on the total composition, of at least one polymeric plasiticzer PL;
    between 0.5 and 2.5 wt.-%, based on the total composition, of at least one monomeric or oligomeric aminofunctional alkoxysilane S1 with a nitrogen content of between 4.5 and 14.5 wt.-%, based on the total weight of S1;
    between 0.5 and 2.5 wt.-%, based on the total composition, of at least one oligomeric aminofunctional alkoxysilane S2 with a nitrogen content of between 15 and 20 wt.-%, based on the total weight of S2.

In the present document, the term "silane group" refers to a silyl group which is bonded to an organic radical or to a polyorganosiloxane radical and has one to three, especially two or three, hydrolyzable substituents on the silicon atom. Particularly useful hydrolyzable substituents are alkoxy radicals. These silane groups are also referred to as "alkoxysilane groups". Silane groups may also be in partly or fully hydrolyzed form, for example as silanols.

"Hydroxysilane", "isocyanatosilane", "aminosilane" and "mercaptosilane" refer respectively to organoalkoxysilanes having one or more hydroxyl, isocyanato, amino or mercapto groups on the organic radical in addition to the silane group.

"aminofunctional compound" refers to a compound which contains an amino group.

"Primary amino group" and "primary amine nitrogen" refer respectively to an $NH_2$ group and the nitrogen atom thereof that is bonded to an organic radical, and "secondary amino group" and "secondary amine nitrogen" refer respectively to an NH group and the nitrogen atom thereof that is bonded to two organic radicals which may also together be part of a ring, and "tertiary amino group" and "tertiary amine nitrogen" refer respectively to an N group and to the nitrogen atom thereof that is bonded to three organic radicals, two or three of which together may also be part of one or more rings. Accordingly, "primary aminosilanes" are aminosilanes comprising a primary amino group and "secondary aminosilanes" are aminosilanes comprising a secondary amino group. The latter also encompasses compounds having both a primary and a secondary amino group.

"Polyoxyalkylene radical" refers to a linear hydrocarbyl radical which contains ether groups and contains more than two repeat units of the (O—R) type in succession, where R is an alkylene radical, as for example from the polyaddition of ethylene oxide or 1,2-propylene oxide onto starter molecules having two active hydrogen atoms.

Substance names beginning with "poly", such as polyol or polyisocyanate, refer to substances containing, in a formal sense, two or more of the functional groups that occur in their name per molecule.

The term "organic polymer" encompasses a collective of macromolecules that are chemically homogeneous but differ in relation to degree of polymerization, molar mass and chain length, which has been prepared by a poly reaction (polymerization, polyaddition, polycondensation) and has a majority of carbon atoms in the polymer backbone, and reaction products of such a collective of macromolecules. Polymers having a polyorganosiloxane backbone (commonly referred to as "silicones") are not organic polymers in the context of the present document.

The term "polyether containing silane groups" also encompasses organic polymers which contain silane groups and which, in addition to polyether units, may also contain urethane groups, urea groups or thiourethane groups. Such polyethers containing silane groups may also be referred to as "polyurethanes containing silane groups".

"Molecular weight" is understood in the present document to mean the molar mass (in grams per mole) of a molecule or part of a molecule, also referred to as "radical". "Average molecular weight" is understood to mean the number-average $M_n$ of an oligomeric or polymeric mixture of molecules or radicals, which is typically determined by means of gel permeation chromatography (GPC) against polystyrene as standard.

"Storage-stable" or "storable" refers to a substance or composition when it can be stored at room temperature in a suitable container over a prolonged period, typically at least 3 months up to 6 months or more, without any change in its application or use properties, especially in the viscosity and crosslinking rate, to a degree of relevance for the use thereof as a result of the storage.

"Room temperature" refers to a temperature of about 23° C.

A dotted line in the formulae in this document in each case represents the bond between a substituent and the corresponding molecular radical.

Nitrogen content of an aminofunctional alkoxysilane can be measured by the Kjeldahl method or the Dumas method, both which are known to the skilled person in the field of analytical chemistry.

The inventive composition comprises between 0.5 and 2.5 wt.-%, based on the total composition, of at least one monomeric or oligomeric aminofunctional alkoxysilane S1 with a nitrogen content of between 4.5 and 14.5 wt.-%, preferably between 5 and 10 wt.-% based on the total weight of S1. Preferably, the inventive composition comprises between 1 and 2 wt.-%, based on the total composition, of the monomeric or oligomeric aminofunctional alkoxysilane S1.

Additionally, the inventive composition comprises between 0.5 and 2.5 wt.-%, based on the total composition, of at least one oligomeric aminofunctional alkoxysilane S2 with a nitrogen content of between 15 and 20 wt.-%, based on the total weight of S2. Preferably, the inventive composition comprises between 1 and 2 wt.-%, based on the total composition, of the oligomeric aminofunctional alkoxysilane S2.

One advantage of the high nitrogen content, especially of the oligomeric oligomeric aminofunctional alkoxysilane S2, is a faster adhesion build-up after application of the adhesive composition.

Silane S1 may be monomeric or oligomeric, silane S2 may only be oligomeric. The oligomeric forms of S1 and S2 are linear, branched, or cyclic oligomers, formed by the partial hydrolysis and condensation of monomeric aminofunctional alkoxysilanes, and, in some embodiments, partially with other, not aminofunctional alkoxysilanes, such as alkyl alkoxysilanes or tetraalkoxysilanes.

One advantage of using oligomeric alkoxysilanes S1 and S2 is that lower VOC levels can be achieved when employing them in greater amounts compared to purely monomeric silanes.

Monomeric aminofunctional alkoxysilanes that are suitable as silane S1 or as precursor for the production of oligomeric silanes S1 or S2 are shown in formula (I),

where $R^2$ is a monovalent alkyl radical having 1 to 6 carbon atoms, preferably 1 or 2 carbon atoms, most preferably a methyl radical;

$R^3$ is a monovalent aminoalkyl radical selected from —$C_pH_{2p}$—$NH_2$, —$C_pH_{2p}$—NH—$R^5$, —$C_pH_{2p}$—NH—$C_dH_{2d}$—$NH_2$, —$C_pH_{2p}$—NH—$C_dH_{2d}$—NH—$C_eH_{2e}$—$NH_2$, —$C_pH_{2p}$—NH—$C_dH_{2d}$—NH—$R^5$, and —$C_pH_{2p}$—NH—$C_dH_{2d}$—NH—$C_eH_{2e}$—NH—$R^5$;

$R^4$ is a monovalent linear, branched, or cyclic alkyl or arakyl radical having 1 to 12 carbon atoms, preferably 1 to 8 carbon atoms, most preferably a methyl radical;

$R^5$ is a monovalent linear, branched, or cyclic alkyl or arakyl radical having 1 to 12 carbon atoms, preferably 1 to 6 carbon atoms;

index i is an integer with a value of 0 or 1, preferably 0;

index k is an integer with a value of 2 or 3, with the proviso that if i=1 then k=2;

index p is an integer with a value of 1 to 6;

indices d and e are independently integers with a value of 2 to 6.

Suitable oligomeric silanes S1 or S2 are shown in formula (II) and (III), where formula (II) shows linear oligomers and formula (III) shows cyclic oligomers. It is possible to also use branched oligomers, at least in portions of a mixture of oligomers.

Suitable linear oligomers for use as oligomeric silanes S1 or S2 are shown in formula (II),

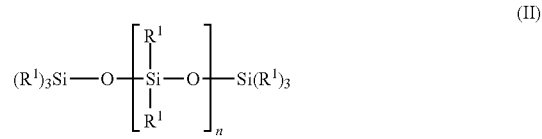

where
$R^1$ independently stands for an alkoxy radical with 1 to 6 carbon atoms, preferably 1 or two carbon atoms, more preferably a methoxy radical an $R^3$ as defined above, or an $R^4$ as defined above; and index n is an integer with a value of 1 to 30.

Suitable cyclic oligomers for use as oligomeric silanes S1 or S2 are shown in formula (III),

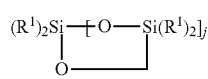
(III)

where $R^1$ has the same meaning as above; and

Index j is an integer with a value of 3 to 30.

Preferred monomeric or oligomeric aminofunctional alkoxysilanes S1 include N-(n-Butyl)-3-aminopropyltrimethoxysilane, 3-aminopropyltrimethoxysilane, 3-aminopropyldimethoxymethyl-silane, N-(2-aminoethyl)-3-aminopropyltrimethoxysilane, N-(2-aminoethyl)-3-aminopropyldimethoxymethylsilane, N-(2-aminoethyl)-N'-[3-(trimethoxysilyl)-propyl]ethylenediamine and oligomers obtained from the condensation of the mentioned aminosilanes, optionally oligomerized together with alkylalkoxysilanes, in particular methyltrimethoxysilane, ethyltrimethoxysilane, propyltrimethoxysilane, vinyltrimethoxysilane, n-butyltrimethoxysilane, isobutyltrimethoxysilane, phenyltrimethoxysilane, and octyltrimethoxysilane.

Also preferred are monomeric or oligomeric or the analogs thereof with ethoxy in place of methoxy groups.

Most preferred monomeric or oligomeric aminofunctional alkoxysilane S1 include N-(n-Butyl)-3-aminopropyltrimethoxysilane and the oligomers obtained from the condensation of N-(n-Butyl)-3-aminopropyltrimethoxysilane with alkylalkoxysilanes as mentioned above. These silanes, when used in the compositions according to the present invention, have the advantage that the compositions have a particularly low modulus and high movement capabilities after curing, which makes them especially suitable as adhesive sealants.

Preferably, said monomeric or oligomeric aminofunctional alkoxysilane S1 has a viscosity of between 2 and 40 mPa·s, measured at 20° C. according to DIN 53015. This viscosity range enables particularly good adhesion properties.

Many suitable oligomeric aminofunctional alkoxysilanes S2 and the synthetic route to obtain them can be found in WO 2014/079613.

Most preferred oligomeric aminofunctional alkoxysilane S2 is the oligomer obtained from the condensation of N-(n-Butyl)-3-aminopropyltrimethoxysilane.

Preferably, said oligomeric aminofunctional alkoxysilane S2 has a viscosity of between 1500 and 3500 mPa·s, measured at 20° C. according to DIN 53015.

This viscosity range enables a particularly good miscibility with polymer P and particularly good adhesion properties.

In preferred embodiments, said monomeric or oligomeric aminofunctional alkoxysilane S1 and/or said oligomeric aminofunctional alkoxysilane S2 comprise secondary amino groups. These embodiments have the advantage that the compositions have a particularly low modulus and high movement capabilities after curing, which makes them especially suitable as adhesive sealants.

Furthermore required in the composition according to the present invention is at least one polymer P containing silane groups.

The polymer P containing silane groups is in particular selected from the group consisting of polyorganosiloxanes having terminal silane groups and organic polymers containing silane groups, as described more specifically hereinafter.

A polyorganosiloxane having terminal silane groups has the advantage that, in the cured state, it is particularly water- and light-stable and enables particularly flexible properties.

An organic polymer containing silane groups has the advantage of having particularly good adhesion properties on a multitude of substrates and being particularly inexpensive.

In general, it is preferred that the amount of polymer P in the composition is between 10 and 25 wt.-%, based on the total composition. This range allows for good mechanical properties without making the composition too expensive.

In a preferred embodiment, the polymer P containing silane groups is a polyorganosiloxane having terminal silane groups.

A preferred polyorganosiloxane having terminal silane groups has the formula (IV)

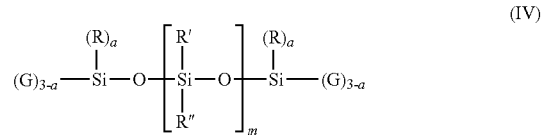
(IV)

where

R, R' and R" are each independently a monovalent hydrocarbyl radical having 1 to 12 carbon atoms;

G is a hydroxyl radical or an alkoxy, acetoxy, ketoximato, amido or enoxy radical having 1 to 13 carbon atoms;

a is 0, 1 or 2; and m is an integer in the range from 50 to about 2'500.

R is preferably methyl, vinyl or phenyl.

R' and R" are preferably each independently an alkyl radical having 1 to 5, preferably 1 to 3, carbon atoms, especially methyl.

G is preferably a hydroxyl radical or an alkoxy or ketoximato radical having 1 to 6 carbon atoms, especially a hydroxyl, methoxy, ethoxy, methylethylketoximato or methylisobutylketoximato radical.

More preferably, G is a hydroxyl radical.

a is preferably 0 or 1, especially 0.

In addition, m is preferably chosen such that the polyorganosiloxane of the formula (IV) has a viscosity at room temperature in the range from 100 to 500'000 mPa·s, especially from 1000 to 100'000 mPa·s, measured according to DIN 53015.

Polyorganosiloxanes of the formula (IV) are easy to handle and crosslink with moisture and/or silane crosslinkers to give solid silicone polymers having elastic properties.

Suitable commercially available polyorganosiloxanes of the formula (IV) are available, for example, from Wacker, Momentive Performance Material, GE Advanced Materials, Dow Corning, Bayer or Shin Etsu.

Preferably, the composition comprises, in addition to the polyorganosiloxane having terminal silane groups, a silane crosslinker, especially a silane of the formula (V),

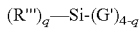
(V)

where

R''' is a monovalent hydrocarbyl radical having 1 to 12 carbon atoms,

G' is a hydroxyl radical or is an alkoxy, acetoxy, ketoximato, amido or enoxy radical having 1 to 13 carbon atoms; and q has a value of 0, 1 or 2, especially 0 or 1.

Particularly suitable silanes of the formula (V) are methyltrimethoxysilane, ethyltrimethoxysilane, propyltrimethoxysilane, vinyltrimethoxysilane, methyltriethoxysilane, vinyltriethoxysilane, phenyltriethoxysilane, tetramethoxysilane, tetraethoxysilane, methyltris(methylethylketoximo)silane, vinyltris(methylethylketoximo)silane and methyltris(isobutylketoximo)silane.

In a further preferred embodiment, the polymer P containing silane groups is an organic polymer containing silane groups, especially a polyurethane, polyolefin, polyester, polycarbonate, polyamide, poly(meth)acrylate or polyether or a mixed form of these polymers, each of which bears one or preferably more than one silane group. The silane groups may be in pendant positions in the chain or in terminal positions and are bonded to the organic polymer via a carbon atom.

More preferably, the organic polymer P containing silane groups is a polyolefin containing silane groups or a polyurethane containing silane groups or a polyether containing silane groups or a mixed form of these polymers.

Most preferably, the organic polymer containing silane groups is a polyether containing silane groups.

The silane groups present in the organic polymer containing silane groups are preferably alkoxysilane groups, especially alkoxysilane groups of the formula (VI)

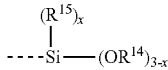

(VI)

where $R^{14}$ is a linear or branched, monovalent hydrocarbyl radical having 1 to 5 carbon atoms, especially methyl or ethyl or isopropyl;

$R^{15}$ is a linear or branched, monovalent hydrocarbyl radical having 1 to 8 carbon atoms, especially methyl or ethyl; and x is a value of 0 or 1 or 2, preferably 0 or 1, especially 0.

More preferably $R^{14}$ is methyl or ethyl.

For particular applications, the $R^{14}$ radical is preferably an ethyl group, since, in this case, ecologically and toxicologically harmless ethanol is released in the course of curing of the composition.

Particular preference is given to trimethoxysilane groups, dimethoxymethyl-silane groups or triethoxysilane groups.

In this context, methoxysilane groups have the advantage that they are particularly reactive, and ethoxysilane groups have the advantage that they are toxicologically advantageous and particularly storage-stable.

The organic polymer containing silane groups has an average of preferably 1.3 to 4, especially 1.5 to 3, more preferably 1.7 to 2.8, silane groups per molecule.

The silane groups are preferably terminal.

The organic polymer containing silane groups preferably has a average molecular weight, determined by means of GPC against a polystyrene standard, in the range from 1'000 to 30'000 g/mol, especially from 2'000 to 20'000 g/mol. The organic polymer containing silane groups preferably has a silane equivalent weight of 300 to 25'000 g/eq, especially of 500 to 15'000 g/eq.

The organic polymer containing silane groups may be solid or liquid at room temperature. It is preferably liquid at room temperature.

Most preferably, the organic polymer containing silane groups is a polymer containing silane groups which is liquid at room temperature, where the silane groups are especially dialkoxysilane groups and/or trialkoxysilane groups, more preferably trimethoxysilane groups or triethoxysilane groups.

Processes for preparing organic polymers containing silane groups are known to the person skilled in the art.

In a preferred process, organic polymers containing silane groups are obtainable from the reaction of organic polymers containing allyl groups with hydrosilanes, optionally with chain extension using, for example, diisocyanates.

In a further preferred process, polyethers containing silane groups are obtainable from the copolymerization of alkylene oxides and epoxysilanes, optionally with chain extension using, for example, diisocyanates.

In a further preferred process, organic polymers containing silane groups are obtainable from the reaction of organic polyols with isocyanatosilanes, optionally with chain extension using diisocyanates.

In a further preferred process, polyethers containing silane groups are obtainable from the reaction of organic polymers containing isocyanate groups, especially NCO-terminated urethane polymers from the reaction of polyols with a superstoichiometric amount of polyisocyanates, with aminosilanes, hydroxysilanes or mercaptosilanes. Polyethers containing silane groups from this process are particularly preferred. This process enables the use of a multitude of inexpensive starting materials of good commercial availability, by means of which it is possible to obtain different polymer properties, for example high extensibility, high strength, low modulus of elasticity, low glass transition point or high weathering resistance.

More preferably, the organic polymer containing silane groups is obtainable from the reaction of NCO-terminated urethane polyethers with aminosilanes or hydroxysilanes. Suitable NCO-terminated urethane polymers are obtainable from the reaction of polyols, especially polyether polyols, in particular polyoxyalkylenediols or polyoxyalkylenetriols, preferably polyoxypropylenediols or polyoxypropylenetriols, with a superstoichiometric amount of polyisocyanates, especially diisocyanates. Also other polyols, such as poly(meth)acrylate polyols, polyhydrocarbon polyols, in particular polybutadiene polyols, polyhdroxy functional fats or oils, polycarbonate polyols, polyester polyols and polyhydroxy functional acrylonitrilie/butadiene copolymers are suitable. Furthermore, small amounts of low molecular weight dihydric or polyhydric alcohols, such as diols, glycols, and sugar alcohols may be used as additives.

Preferably, the reaction between the polyisocyanate and the polyol is conducted with exclusion of moisture at a temperature of 50° C. to 160° C., optionally in the presence of suitable catalysts, with metered addition of the polyisocyanate in such a way that the isocyanate groups thereof are present in a stoichiometric excess in relation to the hydroxyl groups of the polyol. More particularly, the excess of polyisocyanate is chosen such that a content of free isocyanate groups of 0.1% to 5% by weight, preferably 0.2% to 4% by weight, more preferably 0.3% to 3% by weight, based on the overall polymer, remains in the resulting urethane polymer after the reaction of all hydroxyl groups.

Preferred diisocyanates are selected from the group consisting of hexamethylene 1,6-diisocyanate (HDI), 1-isocyanato-3,3,5-trimethyl-5-isocyanatomethylcyclohexane (=isophorone diisocyanate or IPDI), tolylene 2,4- and 2,6-diisocyanate and any desired mixtures of these isomers (TDI) and diphenylmethane 4,4'-, 2,4'- and 2,2'-diisocyanate and any desired mixtures of these isomers (MDI). Particular preference is given to IPDI or TDI. Most preferred is IPDI. In this way, polyethers containing silane groups with particularly good lightfastness are obtained.

Especially suitable as polyether polyols are polyoxyalkylenediols or polyoxyalkylenetriols having a degree of unsaturation lower than 0.02 meq/g, especially lower than 0.01 meq/g, and a mean molecular weight in the range from 400 to 25'000 g/mol, especially 1000 to 20'000 g/mol.

As well as polyether polyols, it is also possible to use portions of other polyols, especially polyacrylate polyols, and low molecular weight diols or triols.

Suitable aminosilanes for the reaction with an NCO-terminated urethane polyether are primary and secondary aminosilanes. Preference is given to 3-aminopropyltrimethoxysilane, 3-aminopropyldimethoxymethylsilane, 4-aminobutyltrimethoxysilane, 4-amino-3-methylbutyltrimethoxysilane, 4-amino-3,3-dimethylbutyltrimethoxysilane, N-butyl-3-aminopropyltrimethoxysilane, N-phenyl-3-aminopropyltrimethoxysilane, adducts formed from primary aminosilanes such as 3-aminopropyltrimethoxysilane, 3-aminopropyldimethoxymethylsilane or N-(2-aminoethyl)-3-aminopropyltrimethoxysilane and Michael acceptors such as acrylonitrile, (meth)acrylic esters, (meth)acrylamides, maleic or fumaric diesters, citraconic diesters or itaconic diesters, especially dimethyl or diethyl N-(3-trimethoxysilylpropyl)aminosuccinate. Likewise suitable are analogs of the aminosilanes mentioned with ethoxy or isopropoxy groups in place of the methoxy groups on the silicon.

Suitable hydroxysilanes for the reaction with an NCO-terminated urethane polyether are especially obtainable from the addition of aminosilanes onto lactones or onto cyclic carbonates or onto lactides.

Aminosilanes suitable for the purpose are especially 3-aminopropyltrimethoxysilane, 3-aminopropyltriethoxysilane, 4-aminobutyltrimethoxysilane, 4-aminobutyltriethoxysilane, 4-amino-3-methylbutyltrimethoxysilane, 4-amino-3-methylbutyltriethoxysilane, 4-amino-3,3-dimethylbutyltrimethoxysilane, 4-amino-3,3-dimethylbutyltriethoxysilane, 2-aminoethyltrimethoxysilane or 2-aminoethyltriethoxysilane. Particular preference is given to 3-aminopropyltrimethoxysilane, 3-aminopropyltriethoxysilane, 4-amino-3,3-dimethylbutyltrimethoxysilane or 4-amino-3,3-dimethylbutyltriethoxysilane.

Suitable lactones are especially γ-valerolactone, γ-octalactone, δ-decalactone, and ε-decalactone, especially γ-valerolactone.

Suitable cyclic carbonates are especially 4,5-dimethyl-1,3-dioxolan-2-one, 4,4-dimethyl-1,3-dioxolan-2-one, 4-ethyl-1,3-dioxolan-2-one, 4-methyl-1,3-dioxolan-2-one or 4-(phenoxymethyl)-1,3-dioxolan-2-one.

Suitable lactides are especially 1,4-dioxane-2,5-dione (lactide formed from 2-hydroxyacetic acid, also called "glycolide"), 3,6-dimethyl-1,4-dioxane-2,5-dione (lactide formed from lactic acid, also called "lactide") and 3,6-diphenyl-1,4-dioxane-2,5-dione (lactide formed from mandelic acid).

Preferred hydroxysilanes which are obtained in this way are N-(3-triethoxysilylpropyl)-2-hydroxypropanamide, N-(3-trimethoxysilylpropyl)-2-hydroxypropanamide, N-(3-triethoxysilylpropyl)-4-hydroxypentanamide, N-(3-triethoxysilylpropyl)-4-hydroxyoctanamide, N-(3-triethoxysilylpropyl)-5-hydroxydecanamide and N-(3-triethoxysilylpropyl)-2-hydroxypropyl carbamate.

In addition, suitable hydroxysilanes are also obtainable from the addition of aminosilanes onto epoxides or from the addition of amines onto epoxysilanes. Preferred hydroxysilanes which are obtained in this way are 2-morpholino-4(5)-(2-trimethoxysilylethyl)cyclohexan-1-ol, 2-morpholino-4(5)-(2-triethoxysilyl-ethyl)cyclohexan-1-ol or 1-morpholino-3-(3-(triethoxysilyl)propoxy)propan-2-ol.

Further suitable polyethers containing silane groups are commercially available products, especially the following: MS Polymer™ (from Kaneka Corp.; especially the 5203H, 5303H, S227, S810, MA903 and S943 products); MS Polymer™ or Silyl™ (from Kaneka Corp.; especially the SAT010, SAT030, SAT200, SAX350, SAX400, SAX725, MAX450, MAX951 products); Excestar® (from Asahi Glass Co. Ltd.; especially the S2410, S2420, S3430, S3630 products); SPUR+* (from Momentive Performance Materials; especially the 1010LM, 1015LM, 1050MM products); Vorasil™ (from Dow Chemical Co.; especially the 602 and 604 products); Desmoseal® (from Bayer MaterialScience AG; especially the S XP 2458, S XP 2636, S XP 2749, S XP 2774 and S XP 2821 products), TEGOPAC® (from Evonik Industries AG; especially the Seal 100, Bond 150, Bond 250 products), Polymer ST (from Hanse Chemie AG/Evonik Industries AG, especially the 47, 48, 61, 61LV, 77, 80, 81 products); Geniosil® STP (from Wacker Chemie AG; especially the E10, E15, E30, E35, WP1, and WP2 products).

Particularly preferred organic polymers containing silane groups have end groups of the formula (VII)

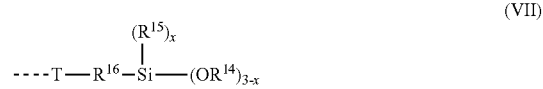

(VII)

where $R^{16}$ is a linear or branched divalent hydrocarbyl radical which has 1 to 12 carbon atoms and optionally has cyclic and/or aromatic moieties and optionally one or more heteroatoms, especially one or more nitrogen atoms;

T is a divalent radical selected from —O—, —S—, —N($R^{17}$)—, —O—CO—N($R^{17}$)—, —N($R^{17}$)—CO—O— and —N($R^{17}$)—CO—N($R^{17}$)—, where $R^{17}$ is a hydrogen radical or a linear or branched hydrocarbyl radical which has 1 to 20 carbon atoms and optionally has cyclic moieties, and which optionally has an alkoxysilane, ether or carboxylic ester group; and $R^{14}$, $R^{15}$ and x have the definitions already given.

Preferably, $R^{16}$ is 1,3-propylene or 1,4-butylene, where butylene may be substituted by one or two methyl groups.

More preferably, $R^{16}$ is 1,3-propylene.

The composition furthermore comprises between 15 and 35 wt.-%, based on the total composition, of at least one polymeric plasticizer PL. Preferably, the polymeric plasticizer PL is comprised with an amount of between 20 and 30 wt.-%, based on the total composition.

The term "polymeric plasticizer" herein means a polymeric additive that is liquid at room temperature and contains no hydrolyzable silane groups. In contrast to traditional plasticizers, such as phthalates, the polymeric plasticizers generally have a higher molecular weight.

Preferably, the polymeric plasticizer PL has an average molecular weight $M_n$ of 500 to 12'000 g/mol, in particular 1'000 to 10'000 g/mol, more preferably 2'500 to 5,000 g/mol.

Suitable polymeric plasticizers PL include polyols, such as those suitable for the production of the organic polymers P mentioned there, as long as they are liquid at room temperature. Preferred polyols suitable as polymeric plasticizers PL include polyether polyols, polyester polyols, polyhydrocarbon polyols, polybutadiene polyols, and poly(meth)acrylate polyols. Particularly preferred are polyether polyols, especially those with an average molecular weight of $M_n$ of 500 to 12'000 g/mol, especially 1'000 to 10'000 g/mol, more preferably 2'500 to 5'000 g/mol.

Such polyols are especially suitable in combination with organic polymers P. Major advantages of using polyether polyols as polymeric plasticizers PL are an especially fast adhesion build-up and especially good adhesion properties.

Furthermore suitable are trialkylsilyl-terminated polydialkylsiloxanes, preferably trimethylsilyl-terminated polydimethylsiloxanes, especially having viscosities in the range from 10 to 1'000 mPa·s, or corresponding compounds in which some of the methyl groups have been replaced by other organic groups, especially phenyl, vinyl or trifluoropropyl groups. Those plasticizers are especially suitable in combination with polyorganosiloxanes as polymers P.

The composition may comprise further catalysts, especially for the crosslinking of silane groups. Suitable further catalysts are especially metal compounds and/or basic nitrogen or phosphorus compounds.

Suitable metal compounds are especially compounds of tin, titanium, zirconium, aluminum or zinc, especially diorganotin(IV) compounds such as, in particular, dibutyltin(IV) diacetate, dibutyltin(IV) dilaurate, dibutyltin(IV) dineodecanoate or dibutyltin(IV) bis(acetylacetonate) and dioctyltin (IV) dilaurate, and also titanium(IV) or zirconium(IV) or aluminum(III) or zinc(II) complexes, especially with alkoxy, carboxylate, 1,3-diketonate, 1,3-ketoesterate or 1,3-ketoamidate ligands.

Suitable basic nitrogen or phosphorus compounds are especially imidazoles, pyridines, phosphazene bases or preferably amines, hexahydrotriazines, biguanides, guanidines or further amidines.

In addition, the composition may comprise, as cocatalyst, an acid, especially a carboxylic acid. Preference is given to aliphatic carboxylic acids such as formic acid, lauric acid, stearic acid, isostearic acid, oleic acid, 2-ethyl-2,5-dimethylcaproic acid, 2-ethylhexanoic acid, neodecanoic acid, fatty acid mixtures from the hydrolysis of natural fats and oils or di- and polycarboxylic acids, especially poly(meth)acrylic acids.

In a preferred embodiment, the composition is essentially free of organotin compounds. Organotin-free compositions are advantageous in terms of protection of health and protection of the environment. More particularly, the tin content of the curable composition is in some preferred embodiments less than 0.1% by weight, especially less than 0.05% by weight. These embodiments are especially beneficial to consumers due to low levels of potentially harmful organotin copounds.

In one embodiment, the composition additionally comprises, as well as the catalyst described, at least one organotitanate. A combination of the catalyst described and an organotitanate has particularly high catalytic activity. This enables rapid curing of such a composition with a comparatively small use amount of organotitanate.

Suitable organotitanates are especially titanium(IV) complexes.

The composition may comprise further constituents, especially the following auxiliaries and additives:

- adhesion promoters and/or crosslinkers, especially further aminosilanes, mercaptosilanes, epoxysilanes, (meth) acryloylsilanes, anhydridosilanes, carbamatosilanes, alkylsilanes or iminosilanes, oligomeric forms of these silanes, adducts formed from primary aminosilanes with epoxysilanes or (meth)acryloylsilanes or anhydridosilanes, amino-functional alkylsilsesquioxanes, 3-glycidoxypropyltrimethoxysilane, 3-glycidoxypropyltriethoxysilane or 3-ureidopropyltrimethoxysilane, or oligomeric forms of these silanes;
- desiccants or drying agents, especially tetraethoxysilane, vinyltrimethoxysilane, vinyltriethoxysilane or organoalkoxysilanes having a functional group in the a position to the silane group, especially N-(methyldimethoxysilylmethyl)-O-methylcarbamate, (methacryloyloxymethyl)silanes, methoxymethylsilanes, orthoformic esters, calcium oxide or molecular sieves, especially vinyltrimethoxysilane or vinyltriethoxysilane;
- additional plasticizers, especially reactive plasticizers, in the form of monofunctional polysiloxanes or monofunctional organic polymers, i.e. those that are silane-reactive at one end, carboxylic esters such as phthalates, especially dioctyl phthalate, bis(2-ethylhexyl) phthalate, bis(3-propylheptyl) phthalate, diisononyl phthalate or diisodecyl phthalate, diesters of ortho-cyclohexane-dicarboxylic acid, especially diisononyl 1,2-cyclohexanedicarboxylate, adipates, especially dioctyl adipate, bis(2-ethylhexyl) adipate, azelates, especially bis(2-ethylhexyl) azelate, sebacates, especially bis(2-ethylhexyl) sebacate or diisononyl sebacate, glycol ethers, glycol esters, organic phosphoric or sulfonic esters, sulfonamides, polybutenes, or fatty acid methyl or ethyl esters derived from natural fats or oils, also called "biodiesel";
- solvents;
- inorganic or organic fillers, especially natural, ground or precipitated calcium carbonates, optionally coated with fatty acids, especially stearic acid, baryte (heavy spar), talcs, quartz flours, quartz sand, dolomites, wollastonites, kaolins, calcined kaolins, mica (potassium aluminum silicate), molecular sieves, aluminum oxides, aluminum hydroxides, magnesium hydroxide, silicas including finely divided silicas from pyrolysis processes, industrially produced carbon blacks, graphite, metal powders such as aluminum, copper, iron, silver or steel, PVC powder or hollow spheres;
- fibers, especially glass fibers, carbon fibers, metal fibers, ceramic fibers or polymer fibers such as polyamide fibers or polyethylene fibers;
- dyes;
- pigments, especially titanium dioxide or iron oxides;
- rheology modifiers, in particular thickeners or thixotropy additives, especially sheet silicates such as bentonites, derivatives of castor oil, hydrogenated castor oil, polyamides, polyurethanes, urea compounds, fumed silicas, cellulose ethers or hydrophobically modified polyoxyethylenes;
- stabilizers against oxidation, heat, light or UV radiation;
- natural resins, fats or oils such as rosin, shellac, linseed oil, castor oil or soya oil;
- non-reactive polymers that are preferably solid at room temperature such as, in particular, homo- or copolymers of unsaturated monomers, especially from the group comprising ethylene, propylene, butylene, isobutylene, isoprene, vinyl acetate or alkyl (meth) acrylates, especially polyethylenes (PE), polypropylenes (PP), polyisobutylenes, ethylene-vinyl acetate copolymers (EVA) or atactic poly-α-olefins (APAO);

flame-retardant substances, especially the already mentioned fillers aluminum hydroxide and magnesium hydroxide, or, in particular, organic phosphoric esters such as, in particular, triethyl phosphate, tricresyl phosphate, triphenyl phosphate, diphenyl cresyl phosphate, isodecyl diphenyl phosphate, tris(1,3-dichloro-2-propyl) phosphate, tris(2-chloroethyl) phosphate, tris(2-ethylhexyl) phosphate, tris(chloroisopropyl) phosphate, tris(chloropropyl) phosphate, isopropylated triphenyl phosphate, mono-, bis- or tris(isopropylphenyl) phosphates of different degrees of isopropylation, resorcinol bis(diphenyl phosphate), bisphenol A bis (diphenyl phosphate) or ammonium polyphosphates;

surface-active substances, especially wetting agents, leveling agents, deaerating agents or defoamers;

biocides, especially algicides, fungicides or substances that inhibit fungal growth;

and other substances customarily used in curable compositions. It may be advisable to chemically or physically dry certain constituents before mixing them into the composition.

The composition preferably comprises between 0.5 and 2.5 wt.-%, preferably between 1 and 2 wt.-%, based on the total composition, of at least one desciccant or drying agent, most preferably vinyl trimethoxysilane. This range has the advantage that an optimal storage stability and skin formation time can be achieved without rendering the product too stiff and/or brittle after curing.

In a preferred embodiment, the composition comprises at least one desiccant and at least one adhesion promoter and/or crosslinker.

In a preferred embodiment, the composition does not comprise any phthalates as plasticizers. Such compositions are toxicologically advantageous and have fewer problems with migration effects.

The composition is preferably produced and stored with exclusion of moisture. Typically, it is storage-stable with exclusion of moisture in a suitable package or arrangement, such as, more particularly, a bottle, a canister, a pouch, a bucket, a vat or a cartridge.

The composition may take the form of a one-component or of a multi-component, especially two-component, composition.

In the present document, "one-component" refers to a composition in which all constituents of the composition are stored in a mixture in the same container and which is curable with moisture.

In the present document, "two-component" refers to a composition in which the constituents of the composition are present in two different components which are stored in separate containers. Only shortly before or during the application of the composition are the two components mixed with one another, whereupon the mixed composition cures, optionally under the action of moisture.

If the composition comprises a polyorganosiloxane having terminal silane groups, preference is given either to a one-component composition, also referred to as RTV-1, or to a two-component composition, also referred to as RTV-2. In the case of an RTV-2 composition, the polyorganosiloxane having terminal silane groups is preferably a constituent of the first component, and a silane crosslinker, especially a silane crosslinker of the formula (VI), is preferably a constituent of the second component. The amidine of the formula (I) or a reaction product thereof may be present in the first and/or the second component.

If the composition comprises an organic polymer containing silane groups, the composition is preferably a one-component composition.

Any second or optionally further components is/are mixed with the first component prior to or on application, especially by means of a static mixer or by means of a dynamic mixer.

The composition is especially applied at ambient temperature, preferably within a temperature range between 0° C. and 45° C., especially 5° C. to 35° C., and cures under these conditions.

On application, the crosslinking reaction of the silane groups commences, if appropriate under the influence of moisture. Silane groups present can condense with silanol groups present to give siloxane groups (Si—O—Si groups). Silane groups present can also be hydrolyzed on contact with moisture to give silanol groups (Si—OH groups) and form siloxane groups (Si—O—Si groups) through subsequent condensation reactions. As a result of these reactions, the composition ultimately cures. The amidine of the formula (I) or a reaction product thereof accelerates this curing.

If water is required for the curing, this can either come from the air (air humidity), or else the composition can be contacted with a water-containing component, for example by painting, for example with a smoothing agent, or by spraying, or water or a water-containing component can be added to the composition on application, for example in the form of a water-containing or water-releasing liquid or paste. A paste is especially suitable if the composition itself is in the form of a paste.

In the case of curing by means of air humidity, the composition cures from the outside inward, at first forming a skin on the surface of the composition. What is called the "skin time" or "skin formation time" is a measure of the curing rate of the composition. The speed of curing is generally determined by various factors, for example the availability of water, temperature, etc.

The composition is suitable for a multitude of uses, especially as a paint, varnish or primer, as a resin for production of fiber composites, as a rigid foam, flexible foam, molding, elastomer, fiber, film or membrane, as a potting compound, sealant, adhesive, covering, coating or paint for construction and industrial applications, for example as a seam seal, cavity seal, electrical insulation compound, spackling compound, joint sealant, weld or crimp seam sealant, assembly adhesive, bodywork adhesive, glazing adhesive, sandwich element adhesive, laminating adhesive, window and façade membrane adhesive, laminate adhesive, packaging adhesive, wood adhesive, parquet adhesive, anchoring adhesive, floor covering, floor coating, balcony coating, roof coating, concrete protection coating, parking garage coating, seal, pipe coating, anticorrosion coating, textile coating, damping element, sealing element or spackling compound.

The composition is particularly suitable as an adhesive and/or sealant, especially for joint sealing and for elastic adhesive bonds in construction and industrial applications, and as elastic coating with crack-bridging properties, especially for protection and/or sealing of, for example, roofs, floors, balconies, parking decks or concrete pipes.

The composition is thus preferably an adhesive or a sealant or a coating.

A composition of this kind typically comprises plasticizers, fillers, adhesion promoters and/or crosslinkers and desiccants, and optionally further auxiliaries and additives.

For an application as adhesive or sealant, the composition preferably has a pasty consistency with structurally viscous properties. Such a pasty sealant or adhesive is especially applied to a substrate from standard cartridges which are operated manually, by means of compressed air or with a battery, or from a vat or hobbock by means of a delivery pump or an extruder, optionally by means of an application robot.

For an application as coating, the composition preferably has a liquid consistency at room temperature with self-leveling properties. It may be slightly thixotropic, such that the coating is applicable to sloping to vertical surfaces without flowing away immediately. It is especially applied by means of a roller or brush or by pouring-out and distribution by means, for example, of a roller, a scraper or a notched trowel.

On application, the composition is preferably applied to at least one substrate. Suitable substrates are especially

- glass, glass ceramic, concrete, mortar, brick, tile, gypsum and natural rocks such as limestone, granite or marble;
- metals and alloys such as aluminum, iron, steel and nonferrous metals, and also surface-finished metals and alloys such as galvanized or chromed metals or surface coated metals, such as Kynar®- or Duranar®-coated alumium;
- leather, textiles, paper, wood, woodbase materials bonded with resins, for example phenolic, melamine or epoxy resins, resin-textile composites and further polymer composites;
- plastics such as polyvinyl chloride (rigid and flexible PVC), acrylonitrile-butadiene-styrene copolymers (ABS), polycarbonate (PC), polyamide (PA), polyesters, poly(methyl methacrylate) (PMMA), epoxy resins, polyurethanes (PUR), polyoxymethylene (POM), polyolefins (PO), polyethylene (PE) or polypropylene (PP), ethylene/propylene copolymers (EPM) and ethylene/propylene/diene terpolymers (EPDM), and also fiber-reinforced plastics such as carbon fiber-reinforced plastics (CFP), glass fiber-reinforced plastics (GFP) and sheet molding compounds (SMC), where the plastics may have been surface-treated by means of plasma, corona or flames;
- coated substrates such as powder-coated metals or alloys;
- paints or varnishes, especially automotive topcoats;
- bituminous substrates such as bitumen, PE laminates with bituminous backside.

If required, the substrates can be pretreated prior to the application of the composition, especially by chemical and/or physical cleaning methods or by the application of an adhesion promoter, an adhesion promoter solution or a primer.

The composition is particularly suitable for contact with bituminous substrates that are problematic due to migrating substances.

The composition is furthermore particularly suitable for polyolefinic and other substrates with low surface energy.

In general, it is not required to pre-treat the surfaces prior to application of the composition. The composition shows an excellent adhesion profile on a large variety of unprimed, non-pretreated, and even uncleaned materials.

Another aspect of the present invention is thus the use of a monomeric or oligomeric aminofunctional alkoxysilane S1 with a nitrogen content of between 4.5 and 7.5 wt.-%, based on the total weight of S1, in combination with an oligomeric aminofunctional alkoxysilane S2 with a nitrogen content of between 11 and 20 wt.-%, based on the total weight of S2, in an adhesive composition comprising at least one polymer P containing silane groups to improve the adhesion of said adhesive on thermoplastic and/or bituminous substrates.

The compositions disclosed herein generally possess a very fast adhesion build-up leading to excellent adhesion after 7 d curing under standard climatic conditions, is preferred embodiments even after 24 h curing under standard climatic conditions.

It is possible to bond or seal two identical or two different substrates, especially the aforementioned substrates.

After the curing of the composition with water, especially in the form of air humidity, and/or with at least one suitable crosslinker, a cured composition is obtained.

The composition according to the present invention has exceptionally low volatile organic carbon (VOC) levels during and after curing. Furthermore, it typically has a storage stability of at least 12 months in a unopend container.

Another aspect of the present invention is the use of an adhesive composition as described herein to adhesively bond or seal substrates.

A preferred use according to the present invention is the use with substrates that are selected from the group fluoropolymer-coated aluminum, in particular polyvinylidene fluoride (PVDF)-coated aluminum, rubber, in particular EPDM rubber, poly(methyl methacrylate), polycarbonate, polyolefins, in particular spun-woven polypropylene, and polyethylene laminated with bituminous backside.

The use of the composition gives rise to an article which especially has been bonded, sealed or coated with the composition. The article is especially a built structure, especially a structure built by structural engineering or civil engineering, an industrially manufactured good or a consumable good, especially a window, a domestic appliance or a mode of transport such as, more particularly, an automobile, a bus, a truck, a rail vehicle, a ship, an aircraft or a helicopter; or the article may be an installable component thereof.

Another aspect of the present invention is thus a substrate, adhesively sealed or bonded by an adhesive composition described herein.

EXAMPLES

Adduced hereinafter are working examples which are intended to elucidate the invention described in detail. It will be appreciated that the invention is not restricted to these described working examples.

"Standard climatic conditions" refer to a temperature of 23±1° C. and a relative air humidity of 50±5%.

Viscosities mentioned in the tables are referring to measurements done according to DIN 53015 measured at 20° C.

Adhesions were tested according to the following procedure: To examine the adhesion, the respective substrate was briefly wiped with a cellulose cloth containing isopropyl alcohol and after 10 min, the adhesive to be tested was applied to the substrate as a round bead with a caulking gun and a nozzle. Then, the adhesive was cured for 7 days at 23° C. and 50% r.h. (standard climatic conditions) and subsequently the adhesion was examined. During the adhesion test, the cured beads were in each case cut slightly over the surface of the substrate (adhesive surface) on one end. The cut end of the bead was grasped and then carefully and slowly, peeling in the direction of the other end of the bead, pulled from the surface of the substrate. In this case, if the adhesion was so strong that the bead end threatened to tear when pulled, a cut was made perpendicular to the bead-pulling direction up to the smooth surface of the small plate by means of a cutter, and a part was thus detached from the bead. Such cuts were, if necessary, repeated at intervals of 2 to 3 mm as pulling continued. In this way, after each corresponding storage time, one third of the bead was pulled or cut from the small plates. The evaluation of the adhesive properties was carried out based on the cured composition, which remained after the bead on the substrate surface was removed (cohesion failure), namely by estimating the cohesive portion of the adhesive surface. The evaluation of the adhesive properties is carried out by estimating the cohesive portion of the adhesive surface:

1: >95% cohesive failure, 2: 75-95% cohesive failure, 3: 25-75% cohesive failure, 4: <25% cohesive failure, 5: 0% cohesive failure (pure adhesive failure). A lower number for the adhesion result means a better adhesion on the substrate.

Compounds Used:

TABLE 1

Compounds used for the example compositions.

| Name | Description, trade name |
|---|---|
| Polymer STP-1 (Polymer P) | Polymer having silane groups; preparation detailed below |
| MS 203H (Polymer P) | Silane-functional polyether polymer (MS Polymer ® S203H, Kaneka) |
| STP-E15 (Polymer P) | Silane-functional polyether polymer (Geniosil ® STP-E15, Wacker) |
| Polyether (Polymeric plasticizer PL) | Polyether polyol (Acclaim ® Polyol 4200, Covestro); $M_n$ approx. 4000 g/mol |
| DIDP (plasticizer) | Diisodecyl phthalate (Jayflex ® DIDP, ExxonMobil) |
| DINCH (plasticizer) | 1,2-Cyclohexane dicarboxylic acid diisononyl ester (Hexamoll ® DINCH, BASF) |
| Thixotropy additive | Modified castor oil (Thixatrol ® ST, Elementis) |
| VTMO (drying agent) | Vinyl trimethoxysilane (Dynasylan ® VTMO, Evonik) |
| AMMO (Silane S1) | 3-Aminopropyltrimethoxysilane with 7.81 wt.-% nitrogen and a viscosity of 2 mPa · s (Dynasylan ® AMMO, Evonik) |
| 1189 (Silane S1) | N-(n-Butyl)-3-aminopropyltrimethoxysilane with 6.8 wt.-% nitrogen and a viscosity of 2.5 mPa · s (Dynasylan ® 1189, Evonik) |
| 1146 (Silane S1) | Oligomer of diaminoalkoxysilane (comprising secondary amino groups) and alkylalkoxysilane with 5-7 wt.-% nitrogen and a viscosity of 35 mPa · s (Dynasylan ® 1146, Evonik) |
| 1124 (Silane) | Bis(trimethoxysilylpropyl)amine with 4.1 wt.-% nitrogen and a viscosity of 6.5 mPa · s (Dynasylan ® 1124, Evonik) |
| A-174 (Silane) | 3-(Trimethoxysilyl)propyl methacrylate (Silquest ® A-174, Momentive) |
| SIVO 280 (Silane S2) | Modified oligomer of N-(n-Butyl)-3-aminopropyltrimethoxysilane with 15.5-17.5 wt.-% nitrogen and a viscosity of ≤3000 mPa · s (Dynasylan ® VPS SIVO 280, Evonik) |
| 6490 (Silane) | Oligomer of vinyl trimethoxysilane without amino groups and a viscosity of 2-4 mPa · s (Dynasylan ® 6490, Evonik) |
| PCC (Filler) | Surface-treated, nanosized precipitated calcium carbonate (Ultra-Pflex ®, Specialty Minerals Inc.) |
| GCC (Filler) | Surface-treated ground limestone (Pfinyl ® 402, Specialty Minerals Inc.) |
| Catalyst | Dibutyltin dilaurate (Fascat ® 4202, PMC Organometallix) |

Preparation of a Polymer P Containing Silane Groups:

Polymer STP-1:

With exclusion of moisture, 1000 g of Acclaim® 12200 polyol (polyoxy-propylenediol having a low level of unsaturation, from Covestro; OH number 11.0 mg KOH/g), 43.6 g of isophorone diisocyanate (IPDI; Vestanat® IPDI, from Evonik), 126.4 g of diisodecyl phthalate (DIDP) and 0.12 g dibutyl tin dilaurate (DBTDL) were heated up to 90° C. while stirring constantly and left at this temperature until the content of free isocyanate groups determined by titrimetry had reached a stable value of 0.63% by weight. Subsequently, 63.0 g of diethyl N-(3-trimethoxysilylpropyl)-aminosuccinate (adduct formed from 3-aminopropyltrimethoxysilane and diethyl maleate; prepared according to the details in U.S. Pat. No. 5,364,955) were mixed in and the mixture was stirred at 90° C. until it was no longer possible to detect any free isocyanate by means of FT-IR spectroscopy. The polyether containing trimethoxysilane groups thus obtained, having a silane equivalent weight of about 6880 g/eq (calculated from the amounts used), was cooled down to room temperature and stored with exclusion of moisture.

Compositions Based on Polymers Containing Silane Groups:

Comparative examples (not according to the present invention) are identified in tables 2 to 5 by "(Ref.)".

Compositions C1 to C11:

A series of example compositions was prepared by mixing the ingredients shown in Tables 2 and 4 under nitrogen atmosphere in a vacuum mixer. First, the polymer P, the plasticizer, the thixotropy additive, and VTMO (where applicable) were thoroughly mixed for 5 minutes. Subsequently, the dried fillers were added with kneading during 15 minutes at 60° C. With the heater switched off, silanes S1 and S2 and other silanes (where applicable) and catalyst were added and the compostions were subsequently processed to a homogeneous paste during 10 minutes under vacuum. Said paste was subsequently filled into internally coated aluminum spreading piston cartridges which were closed air-tight and stored under standard climate conditions for at least 24 h until the testing protocol was employed.

TABLE 2

Example compositions (all numbers in wt.-%, based on the total individual composition).

| Composition | C1 | C2 | C3 (Ref.) | C4 (Ref.) | C5 (Ref.) | C11 (Ref.) |
|---|---|---|---|---|---|---|
| Polymer STP-1 (Polymer P) | 17.5 | 17.5 | 17.5 | 17.5 | 17.5 | 17.5 |
| Polyether (Polymeric plasticizer PL) | 22 | 22 | — | — | 22 | 22 |
| DIDP (plasticizer) | — | — | 22 | 22 | — | — |
| Thixotropy additive | 4 | 4 | 4 | 4 | 4 | 4 |
| VTMO (drying agent) | 2 | 2 | 2 | 2 | 2 | 2 |
| A-174 (Silane) | — | — | — | — | — | 1 |
| 1189 (Silane S1) | 1 | — | 1 | 1 | 1 | — |
| 1146 (Silane S1) | — | 1 | — | — | — | — |
| SIVO 280 (Silane S2) | 1 | 1 | — | 1 | — | 1 |
| PCC (Filler) | 15 | 15 | 15 | 15 | 15 | 15 |
| GCC (Filler) | 37 | 37 | 37 | 37 | 37 | 37 |
| Catalyst | 0.5 | 0.5 | 0.5 | 0.5 | 0.5 | 0.5 |

TABLE 3

Adhesion tests on plastic substrates. The values indicate adhesion performance (details above) after 7 d curing under standard climate conditions.

| Substrate | C1 | C2 | C3 (Ref.) | C4 (Ref.) | C5 (Ref.) | C11 (Ref.) |
|---|---|---|---|---|---|---|
| Acrylonitrile butadiene styrene (ABS) sheet | 1 | 1 | 5 | 5 | 5 | n/m |
| Ethylene propylene diene (M-class) rubber (EPDM) | 1 | 2 | 5 | 5 | 5 | 5 |
| Styrene butadiene rubber (SBR) | 1 | 1 | 5 | 1 | 1 | n/m |

TABLE 3-continued

Adhesion tests on plastic substrates. The values indicate adhesion performance (details above) after 7 d curing under standard climate conditions.

| Substrate | C1 | C2 | C3 (Ref.) | C4 (Ref.) | C5 (Ref.) | C11 (Ref.) |
|---|---|---|---|---|---|---|
| Acrylonitrile butadiene rubber (NBR) | 1 | 1 | 4 | 5 | 3 | n/m |

"n/m" means that this value was not measured.

An additional test with EPDM (Ethylene propylene diene (M-class) rubber) substrate using compositions C1 and C11 was performed by comparing the adhesion after one-week immersion in water (55° C.) of the cured adhesion bead samples. The test sample with composition C1 showed fully cohesive failure ("1") after water immersion while the sample with reference composition C11 showed fully adhesive failure ("5").

TABLE 4

Example compositions (all numbers in wt.-%, based on the total individual composition).

| | Composition | | | | |
|---|---|---|---|---|---|
| | C6 (Ref.) | C7 (Ref.) | C8 (Ref.) | C9 (Ref.) | C10 (Ref.) |
| Polymer STP-1 (Polymer P) | — | 23 | 23 | 23 | — |
| MS 203H (Polymer P) | 48.7 | — | — | — | — |
| STP-E15 (Polymer P) | — | — | — | — | 39 |
| Polyether (Polymeric plasticizer PL) | — | 22 | — | — | 7 |
| DINCH (plasticizer) | — | — | 17 | 16.5 | — |
| Thixotropy additive | 4 | 4 | 4 | 4 | 4 |
| VTMO (drying agent) | 2 | 2 | — | 2 | — |
| 1189 (Silane S1) | 1.5 | — | — | — | — |
| AMMO (Silane S1) | 2 | 1 | — | 1 | — |
| SIVO 280 (Silane S2) | — | — | 1 | — | 1 |
| 1124 (Silane) | — | 0.5 | — | — | — |
| 6490 (Silane) | — | — | 1.5 | — | 1.5 |
| GCC (Filler) | 41.3 | 47 | 53 | 53 | 47 |
| Catalyst | 0.5 | 0.5 | 0.5 | 0.5 | 0.5 |

TABLE 5

Adhesion tests on plastic and polyolefinic laminated bituminous substrates. The values indicate adhesion performance (details above) after 7 d curing under standard climate conditions.

| Substrate | C1 | C2 | C6 (Ref.) | C7 (Ref.) | C8 (Ref.) | C9 (Ref.) | C10 (Ref.) |
|---|---|---|---|---|---|---|---|
| Henry Blueskin Thru-Wall Flashing Membrane (SBS rubberized bituminous backside, laminated yellow smooth polyethylene front) | 1 | 1 | 5 | 5 | 5 | 5 | 5 |
| Grace Perm-A-Barrier Wall Flashing (rubberized bituminous backside, laminated with smooth polyethylene front) | 1 | 1 | 5 | 5 | 5 | 5 | 5 |
| Carlisle VapAir Seal 725TR (rubberized bituminous backside, laminated with smooth woven polypropylene film) | 1 | 1 | 5 | 5 | 5 | 5 | 5 |
| Henry Blueskin VP160 (PSA polymer layer backside, laminated with a polyethylene/polypropylene fibre cloth, spun woven) | 4 | 3 | 5 | 5 | 5 | 5 | 5 |
| Cetco Envirosheet (SBS rubberized bituminous sheet with polyethylene laminated front) | 1 | 1 | 5 | 5 | 5 | 5 | 5 |
| Ethylene propylene diene (M-class) rubber (EPDM) | 1 | 2 | 5 | 5 | 5 | 5 | 5 |

The invention claimed is:

1. An adhesive composition, comprising
at least one polymer P containing silane groups;
between 15 and 35 wt.-%, based on the total composition, of at least one polymeric plasiticzer PL;
between 0.5 and 2.5 wt.-%, based on the total composition, of at least one monomeric or oligomeric aminofunctional alkoxysilane S1 with a nitrogen content of between 4.5 and 14.5 wt.-%, based on the total weight of S1;
between 0.5 and 2.5 wt.-%, based on the total composition, of at least one oligomeric aminofunctional alkoxysilane S2 with a nitrogen content of between 15 and 20 wt.-%, based on the total weight of S2.

2. The adhesive composition as claimed in claim 1, wherein the polymer P containing silane groups is a polyorganosiloxane having terminal silane groups.

3. The adhesive composition as claimed in claim 1, wherein the polymer P containing silane groups is an organic polymer containing silane groups.

4. The adhesive composition as claimed in claim 2, wherein the organic polymer P containing silane groups is a a polyurethane, polyolefin, polyester, polycarbonate, polyamide, poly(meth)acrylate or polyether or a mixed form of these polymers.

5. The adhesive composition as claimed in claim 1, wherein the polymeric plasticizer PL is a polyether plasticizer.

6. The adhesive composition as claimed in claim 1, wherein the monomeric or oligomeric aminofunctional alkoxysilane S1 and/or the oligomeric aminofunctional alkoxysilane S2 comprise secondary amino groups.

7. The adhesive composition as claimed in claim 1, wherein the monomeric or oligomeric aminofunctional alkoxysilane S1 comprises N-(n-Butyl)-3-aminopropyltrimethoxysilane and/or an oligomer obtained from the condensation of N-(n-Butyl)-3-aminopropyltrimethoxysilane with alkylalkoxysilanes.

8. The adhesive composition as claimed in claim 1, wherein the monomeric or oligomeric aminofunctional alkoxysilane S1 has a viscosity of between 2 and 40 m·Pas, measured at 20° C. according to DIN 53015.

9. The adhesive composition as claimed in claim 1, wherein the oligomeric aminofunctional alkoxysilane S2 comprises an oligomer obtained from the condensation of N-(n-Butyl)-3-aminopropyltrimethoxysilane.

10. The adhesive composition as claimed in claim 1, wherein the oligomeric aminofunctional alkoxysilane S2 has a viscosity of between 1500 and 3500 m·Pas, measured at 20° C. according to DIN 53015.

11. The adhesive composition as claimed in claim 1, wherein the composition comprises the polymer P with an amount of between 10 and 25 wt.-%, based on the total composition.

12. The adhesive composition as claimed in claim 1, wherein the composition furthermore comprises between 0.5 and 2.5 wt.-% vinyl trimethoxysilane, based on the total composition.

13. A method of adhesively bonding or sealing a substrate, comprising applying an adhesive composition according to claim 1 to a substrate.

14. The method according to claim 13, wherein the substrates are selected from the group consisting of fluoropolymer-coated aluminum, rubber, poly(methyl methacrylate), polycarbonate, polyolefins, and polyethylene laminated with bituminous backside.

\* \* \* \* \*